United States Patent [19]

O'Hara et al.

[11] 4,141,860

[45] Feb. 27, 1979

[54] HYDROCRACKING CATALYST

[75] Inventors: Mark J. O'Hara, Mt. Prospect; Russell W. Johnson, Hoffman Estates; Lee Hilfman, Mt. Prospect, all of Ill.

[73] Assignee: UOP Inc., Des Plaines, Ill.

[21] Appl. No.: 838,435

[22] Filed: Sep. 30, 1977

[51] Int. Cl.$^2$ ................ B01J 29/06; C10G 13/02
[52] U.S. Cl. ................ 252/455 Z; 208/111
[58] Field of Search ............ 252/455 Z; 208/111

[56] References Cited

U.S. PATENT DOCUMENTS

| | | | |
|---|---|---|---|
| 2,983,670 | 5/1961 | Seubold, Jr. | 252/455 Z |
| 3,524,809 | 8/1970 | Hansford | 252/455 Z |
| 3,956,104 | 5/1976 | Hilfman et al. | 208/111 |

*Primary Examiner*—Carl Dees
*Attorney, Agent, or Firm*—James R. Hoatson, Jr.; William H. Page, II; John G. Cutts, Jr.

[57] ABSTRACT

Disclosed is a hydrocracking catalyst comprising an alumina-zeolite support, a rare earth exchange metal component, at least one metal component selected from Group VIB or Group VIII and from about 0.1 to about 5 wt. % of at least one component selected from Group IIA based on the weight of the finished catalyst.

7 Claims, No Drawings

HYDROCRACKING CATALYST

BACKGROUND OF THE INVENTION

This invention pertains to a catalytic composition for use in hydrocracking processes to maximize middle distillate yield from hydrocarbons boiling above about 650° F., which composition comprises an alumina-zeolite support, a rare earth exchange metal component, at least one metal component selected from Group VIB or Group VIII and from about 0.1 to about 5 wt. % of at least one component selected from Group IIA based on the weight of the finished catalyst. A considerable number of materials have been heretofore proposed as catalysts for hydrocracking hydrocarbon oils. In the past few years much attention has been devoted to using crystalline aluminosilicates as an element in such hydrocracking catalysts. In general, the crystalline aluminosilicates are used in combination with a porous matrix such as silica-alumina. In some cases the co-catalytic activity of the crystalline aluminosilicate material and the acidic porous matrix with various metallic promoters has been found to be an effective catalyst material.

SUMMARY OF THE INVENTION

Briefly, in accordance with the present invention there is provided an improved catalyst for hydrocracking hydrocarbons. The catalyst comprises an alumina-zeolite support, a rare earth exchange metal component, at least one metal component selected from Group VIB or Group VIII and from about 0.1 to about 5 wt. % of at least one component selected from Group IIA based on the weight of the finished catalyst.

We have found that a catalyst containing crystalline aluminosilicate and alumina and containing from about 0.1 to about 5 wt. % of at least one component selected from Group IIA based on the weight of the finished catalyst exhibits superior yields for the production of middle distillate hydrocarbons when processing hydrocarbons boiling above about 650° F.

DETAILED DESCRIPTION

A preferred hydrocracking catalyst comprises an alumina-zeolite support, a rare earth exchange metal component, at least one metal component selected from Group VIB or Group VIII and from about 0.1 to about 5 wt. % of at least one component selected from Group IIA based on the weight of the finished catalyst.

Certain naturally occurring and synthetic aluminosilicate materials such as faujasite, chabazite, X-type, and Y-type and L-type aluminosilicate materials are commercially available and are effective cracking components. These aluminosilicate materials may be characterized and adequately defined by their X-ray diffraction patterns and compositions. Characteristics of such aluminosilicate materials and methods for preparing them have been presented in the chemical art. They exist as a network of relatively small cavities which are interconnected by numerous pores which are smaller than the cavities. These pores have an essentially uniform diameter at the narrowest cross-section.

These crystalline zeolites are metal aluminosilicates having a crystalline structure such that a relatively large absorption area is present inside each crystal. Access to this area may be had by way of openings or pores in the crystal. They consist basically of three-dimensional frameworks of $SiO_4$ and $AlO_4$ tetrahedra with the tetrahedra cross-linked by the sharing of oxygen atoms. The electrovalence of the tetrahedra containing aluminum is balanced by the inclusion in the crystal of cations, for example, metal ions, ammonium ions, amine complexes, or hydrogen ions.

It is generally known that alkali metal synthetic zeolites and particularly faujasite which have been exchanged with metal and/or hydrogen ions possess a high degree of activity as catalysts for the conversion of hydrocarbons. In particular, it has been found that rare earth ion exchanged faujasite constitutes a particularly effective catalyst or catalyst ingredient for the cracking of high molecular weight petroleum feedstocks to lower molecular weight derivatives such as gasoline. The improvement of the present invention resides in the ability to tailor the product of a hydrocracking process to yield a high ratio of middle distillate hydrocarbons boiling in the range of about 300° F. to about 650° F.

To date many rare earth exchanged faujasite containing catalysts have been prepared which possess the thermal stability and activity characteristics necessary for the successful commercial cracking of hydrocarbons. However, most of these commercial catalyst compositions frequently lack the precise catalytic selectivity necessary to yield a product stream which comprises an optimum distribution of desirable end products. In other words, present day rare earth exchanged zeolites which constitute highly active catalysts frequently do not possess the selectivity characteristics which are desirable for optimum commercial operation at a given time.

An essential feature of our catalyst is a rare earth exchanged zeolite. The zeolite may be exchanged with rare earth either before or after the alumina is combined with zeolite and according to any suitable method of manner. For example, the rare earth salt solution may be prepared using commercially available rare earth salts which are generally a mixture of lanthanum, cerium and minor quantities of other rare earths. Preferably rare earth chlorides are used, however, it is also contemplated sulfates and nitrates may be used if desired. The rare earth exchange solution, preferably contains from about 0.1 to about 1.0 moles of rare earth ion salt per liter of solution. The exchange is conducted preferably at a temperature of from about 100° to about 210° F. over a period of from about 0.1 to about 3 hours. Generally it is preferred that prior to the aforementioned exchange procedure performed on a faujasite, the alkali metal ion content of the faujasite is reduced from an initial level of about 12 to 15% to about 1 to 3% by an $NH_4NO_3$ exchange or any other suitable method.

Another essential feature of the catalyst of the present invention is a hydrogenation component selected from Group VI or Group VIII of the Periodic Table. One or more hydrogenation components may be suitably employed to provide the desired hydrocracking reactions. The hydrogenation component may be incorporated into the zeolite or zeolite-containing support by conventional procedures including (1) cation exchange using an aqueous solution of a metal salt wherein the metal itself forms the cations, (2) cation exchange using an aqueous solution of a metal compound in which the metal is in the form of a complex cation with coordination complexing agents such as ammonia, followed by thermal decomposition of the cationic complex, (3) impregnation with a solution of a suitable metal salt in water or in an organic solvent, followed by drying and thermal decomposition of the metal compound. The hydrogenation component is also conventional and includes metals, oxides or sulfides of Groups VIB and VIII. Specific examples include chromium, molybdenum, tungsten, iron, cobalt, nickel, platinum, palladium and rhodium or any combination of these metals or their oxides or sulfides. Amounts of the hydrogenation component will usually range from about 0.1% to about 25% by weight of the final composition, based on free metal. Generally, optimum proportions will range from about 0.5% to about 20% by weight.

Hydrogenation components from Group VIII can be incorporated into the zeolite by impregnation or cation exchange. Iron, cobalt, or nickel can be exchanged from solutions of their salts. The latter method is particularly useful for adding palladium and platinum. Platinum group metals are normally added only as hydrogenation components and are usually employed in amounts of about 0.1 to about 3 wt. %. Other Group VIII elements can serve as both hydrogenation components and stabilizing cations to prevent hydrothermal degradation of the zeolite. They are usually employed in amounts of about 1 to about 10 wt. %.

Hydrogenation components from Group VIB are usually added to the zeolite by impregnation, adsorption, or mixing powders or slurries. These elements are particularly active as oxides and sulfides. The optimum amount is usually within the range from about 5 to about 25 wt. %, based on the free metal.

We have discovered that another essential component of the catalyst of the present invention is at least one element selected from Group IIA. Said Group IIA components are meant to include beryllium, magnesium, calcium, strontium and barium. The prior art has long recognized that the presence of any zeolitic alkaline earth metal cations in amounts exceeding about 1–2 wt. % substantially reduces the activity of the catalyst for acid catalyzed reactions such as cracking, hydrocracking, isomerization, etc. However, we have found improved hydrocracking selectivity to middle distillate hydrocarbons boiling in the range of about 300° F. to about 650° F. may be obtained by incorporating from about 0.1 to about 5 wt. % of at least one metal component selected from Group IIA.

The Group IIA metal components may be added to the catalyst at any desired stage in its manufacture. Preferred methods include impregnation and/or ion-exchange of soluble metal salts into the zeolite or zeolite containing support material.

The alumina and zeolite is pelleted or otherwise treated to obtain catalyst particles of the size and shape desired for the reaction to be catalyzed. A suitable alumina-zeolite support is prepared by mixing equal volumes of finely divided alumina and sodium form faujasite powder together with nitric acid solution to form a paste which is extruded and dried. A further step of calcination may be employed to give added strength to the extrudate. Generally, calcination is conducted in a stream of dry air at a temperature of from about 500° F. to about 1500° F.

The hydrocracking feed stocks that may be treated using the catalyst of the invention are hydrocarbons boiling above about 650° F. which includes straight-run gas oils, coker distillate gas oils, reduced crude oils, cycle oil derived from catalytic or thermal cracking operations and the like. These fractions may be derived from petroleum crude oils, shale oils, tar sand oils, coal hydrogenation products and the like.

The process of this invention may be carried out in any equipment suitable for catalytic operations. It may be operated batchwise or continuously. Accordingly, the process is adapted to operations using a fixed bed of catalyst. Also, the process can be operated using a moving bed of catalyst wherein the hydrocarbon flow may be concurrent or countercurrent to the catalyst flow. A fluid type of operation may also be employed. After hydrocracking, the resulting products may be separated from the remaining components by conventional means such as adsorption or distillation. Also, the catalyst after use over an extended period of time may be regenerated in accordance with conventional procedures by burning off carbonaceous deposits from the surface of the catalyst in an oxygen-containing atmosphere under conditions of elevated temperature.

The following examples will serve to more particularly illustrate the preparation of the catalysts of the invention and their advantageous properties in selectively hydrocracking to yield middle distillate hydrocarbons boiling in the range of about 350° F. to about 650° F. It is understood that the examples are intended to be illustrative rather than restrictive and the only limit to the scope of the invention is to be provided by the claims hereinafter appended.

Examples 1 through 3 illustrate the preparation and testing of three nickel-tungsten-zeolite Y-Al$_2$O$_3$ catalysts. Example 1 is illustrative of the prior art catalysts which contain low residual alkali metal content. Examples 2 and 3 are illustrative of the catalysts of the present invention which contain from about 0.1 to about 5 wt. % of at least one component selected from Group IIA. The catalysts of Examples 2 and 3 contain a calcium component and a magnesium component, respectively.

EXAMPLE I

Equal quantities of a Linde Na Y, SK-40, sieve material and Kaiser substrate alumina were admixed and extruded with the aid of a small amount of nitric acid solution through a 2 mm die plate. The extrudate was broken into particles with an L/D of about 3. The extrudate particles were dried for about 1 hour at 200° F. and then calcined for about 1 hour at 1100° F. The calcined particles were exchanged with an NH$_4$NO$_3$ solution and then washed with water. The resulting water-washed particles were then exchanged with a rare earth salt solution. The rare earth salt solution had a pH of about 4 during the exchange procedure. The rare earth solution was prepared using commercially available rare earth salts which are generally a mixture of lanthanum, cerium and minor quantities of other rare earths. Suitable rare earth salts are chlorides, sulfates and nitrates. The rare earth exchange solution contained about one mole of rare earth salt per liter. The exchange was conducted at a temperature of about 140° F. to about 200° F. over a period of about one hour.

Subsequent to rare earth exchange the support particles were subjected to a calcination conducted at a temperature of about 930° F. over a period of about one hour. This calcination step generally performs the function of fixing the rare earth ion in the support structure and furthermore converts the ammonium ions to hydrogen ions while emitting ammonia. A portion of the resulting calcined rare earth exchanged faujasite-alumina support was prewet with water, then exchanged for 1½ hours at 200° F. with a 10% NH$_4$NO$_3$ solution to reduce the sodium level to less than 0.5 wt. %. After water washing, the low sodium content support was calcined for one hour at about 930° F. and for one hour at about 1100° F. The calcined support was then impregnated with an aqueous solution containing nickel nitrate and ammonium metatungstate to yield a finished catalyst with 4% nickel and 14% tungsten. The impregnated support was dried and then calcined for about one hour at about 1100° F. A portion of the catalyst prepared as hereinabove described and containing 0.46% by weight sodium was tested in a continuous hydrocracking apparatus with a vacuum gas oil being employed as the charge stock. The results of an inspection of the vacuum gas oil charge stock are presented in Table I.

TABLE I

| Vacuum Gas Oil Charge Stock Inspection | |
|---|---|
| Specific Gravity, ° API | 19.8 |
| Distillation, ° F | |
| IBP | 560 |
| 10 | 690 |
| 50 | 851 |
| 90 | 988 |
| EP | 1068 |
| Aromatics, vol. % | 58.4 |
| Paraffin and Naphthene, vol. % | 41.6 |

The reaction zone was maintained at a pressure of 2000 psig, a liquid hourly space velocity of 1.0 hr.$^{-1}$, a hydrogen circulation rate of 12,000 SCFB and a temperature sufficient to obtain 80 vol. % of the product boiling below 650° F., i.e., 80% conversion. At a 80% conversion level, the product volume percent boiling in the range of 300°-650° F. was 34.1%. The selectivity is defined as the ratio of the volume percent of the product boiling in the range of 300°-650° F. to the conversion and in this particular case was 0.43. The results of this hydrocracking test are tabulated in Table II.

hour. This calcination step generally performs the function of fixing the rare earth ion in the support structure and furthermore converts the ammonium ions to hydrogen ions while emitting ammonia. A portion of the resulting calcined rare earth exchanged faujasite-alumina support was prewet with water, then exchanged for 1½ hours at 200° F. with a 10% $NH_4NO_3$ solution to reduce the sodium level to 0.43 wt. %. After water washing, the low sodium content support was impregnated with an aqueous solution of calcium chloride to produce a support containing 1.0% calcium by weight. This support was then impregnated with an aqueous solution containing nickel nitrate and ammonium metatungstate to yield a finished catalyst with 4 wt. % nickel and 14 wt. % tungsten. The impregnated support was dried and then calcined for about one hour at about 1100° F. A portion of the catalyst prepared as hereinabove described was tested in exactly the same manner as described in Example I.

At an 80% conversion level, the product volume percent boiling in the range of 300°-650° F. was 44% and the selectivity, as hereinabove described, was 0.55. The results of this test are tabulated in Table II.

EXAMPLE III

Another portion of the resulting calcined rare earth exchanged faujasite-alumina support, as described and prepared in Example II hereinabove, was prewet with water, then exchanged for 1½ hours at 200° F. with a 10% $NH_4NO_3$ solution to reduce the sodium level to 0.49 wt. %. After water washing, the low sodium content support was impregnated with an aqueous solution

TABLE II

| | The effect of Alkali Metal Modifiers on Zeolite-Alumina Catalysts | | | |
|---|---|---|---|---|
| Example | Catalyst | Fresh Feed Conversion[1], Vol. % | Product Volume % in the Boiling Range of 300-650° F. | Selectivity[2] |
| 1 | Reference[3] | 80 | 34.1 | 0.43 |
| 2 | 1.0% Calcium[3] | 80 | 44.0 | 0.55 |
| 3 | 0.5% Magnesium[3] | 80 | 53.0 | 0.66 |

[1]Conversion is volume percent of product boiling under 650° F.
[2]Selectivity is the ratio of the volume percent of the product boiling in the range of 300–650° F. to the conversion.
[3]The catalysts employed in the Examples contained 0.46, 0.43 and 0.49 wt. % sodium, respectively.

EXAMPLE II

Equal quantities of a Linde Na Y, SK-40, sieve material and Kaiser substrate alumina were admixed and extruded with the aid of a small amount of nitric acid solution through a 2 mm die plate. The extrudate was broken into particles with an L/D of about 3. The extrudate particles were dried for about one hour at 200° F. and then calcined for about one hour at 200° F. and then calcined for about one hour at 1100° F. The calcined particles were exchanged with an $NH_4NO_3$ solution and then water washed with water. The resulting water-washed particles were then exchanged with a rare earth salt solution. The rare earth salt solution had a pH of about 4 during the exchange procedure. The rare earth salt solution was prepared using commercially available rare earth salts which are generally a mixture of lanthanum, cerium, and minor quantities of the rare earths. Suitable rare earth salts are chlorides, sulfates and nitrates. The rare earth exchange solution contained about one mole of rare earth salt per liter. The exchange was conducted at a temperature of about 140° F. to about 200° F. over a period of about one hour.

Subsequent to rare earth exchange the support particles were subjected to a calcination conducted at a temperature of about 930° F. over a period of about one of magnesium nitrate to produce a support containing 0.5 wt. % magnesium. This support was then impregnated with an aqueous solution containing nickel nitrate and ammonium metatungstate to yield a finished catalyst with 4 wt. % nickel and 14 wt. % tungsten. The impregnated support was dried and then calcined for about one hour at about 1100° F. A portion of the catalyst prepared as hereinabove described was tested in exactly the same manner as described in Example I.

At an 80% conversion level, the product volume percent boiling in the range of 300°-650° F. was 53% and the selectivity, as hereinabove described, was 0.66. The results of this test are also tabulated in Table II.

From the results of these examples, it is evident that the catalyst of the present invention produced a middle distillate at a superior selectivity when compared with the prior art catalyst. The foregoing specification and examples clearly illustrate the improvements encompassed by the catalyst of the present invention.

We claim as our invention:

1. A hydrocracking catalyst composition comprising an alumina-zeolite support, a rare earth exchange metal component, at least one metal component from Group VIB or Group VIII and from about 0.1 to about 5 wt. % of at least one component from Group IIA based on the weight of the finished catalyst.

2. The catalyst composition of claim 1 wherein the alumina-zeolite weight ratio is from about 1:5 to about 20:1.

3. The catalyst composition of claim 1 wherein the zeolite is Y faujasite.

4. The catalyst composition of claim 1 wherein the rare earth metal component is from about 1 wt. % to about 10 wt. % based on the weight of the finished catalyst.

5. The catalyst composition of claim 1 wherein the metal component from Group IIA is calcium.

6. The catalyst composition of claim 1 wherein the metal component from Group IIA is magnesium.

7. The catalyst composition of claim 1 wherein the metal component selected from Group IIA occupies cation exchange sites.

* * * * *